United States Patent [19]
Nzeadibe et al.

[11] Patent Number: 6,145,397
[45] Date of Patent: Nov. 14, 2000

[54] SIMPLE LIFT ASSIST MODULE

[75] Inventors: Ihioma U. Nzeadibe; Daniel M. Kujaneck, both of San Jose, Calif.

[73] Assignee: Applied Materials, Inc., Santa Clara, Calif.

[21] Appl. No.: 09/165,229

[22] Filed: Oct. 1, 1998

[51] Int. Cl.$^7$ .................................................. F16H 21/44
[52] U.S. Cl. .............................................. 74/97.1; 901/48
[58] Field of Search ...................... 74/97.1; 248/292.11, 248/292.13; 901/48; 16/401, 85

[56] References Cited

U.S. PATENT DOCUMENTS

| | | | |
|---|---|---|---|
| 1,345,261 | 6/1920 | Sellek | 16/401 |
| 1,549,705 | 8/1925 | Antonio | 16/401 |
| 3,447,190 | 6/1969 | Coe | 16/85 |
| 4,653,975 | 3/1987 | Akeel . | |
| 4,659,280 | 4/1987 | Akeel . | |
| 4,753,128 | 6/1988 | Bartlett et al. . | |
| 4,756,204 | 7/1988 | Wittwer et al. . | |
| 4,768,762 | 9/1988 | Lund . | |
| 5,402,690 | 4/1995 | Sekiguchi et al. . | |

*Primary Examiner*—David A. Bucci
*Assistant Examiner*—Colby Hansen
*Attorney, Agent, or Firm*—Peters Verny Jones Biksa

[57] ABSTRACT

A compact lifting device whose load arm is fixed to a cover of lid of a processing chamber provides, a tubular pan body with an externally easily adjustable spring counterweight type member passing through the tubular center of the pan body. The spring member is cleverly mounted between an upper and lower portion of the pan body and rotates with the pan body as the lift mechanism swings from side to side. An innovative center core mounting of the spring device allows loads from the lifted weight to be equally distributed on two side of the pan body. The rotation of the pan body is by the use of bearings which are constructed so that a flange of pan body is utilized as two races of a ball bearing further reducing the space need for mounting such a lifting device.

19 Claims, 16 Drawing Sheets

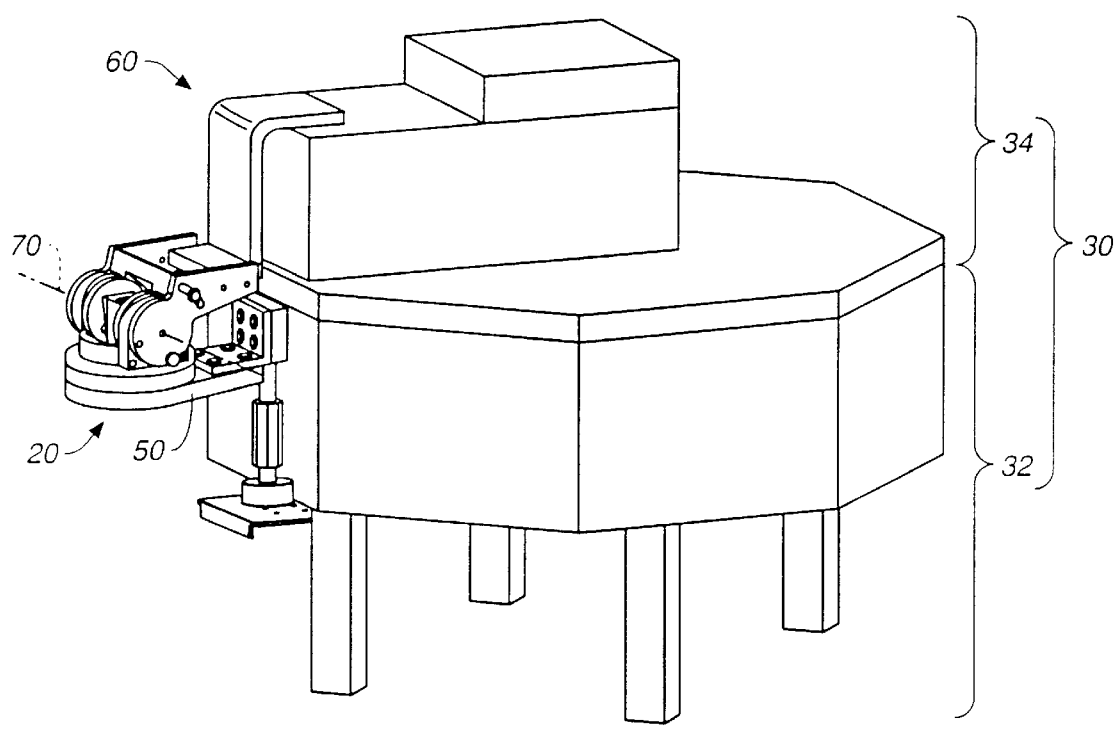
FIG._1A

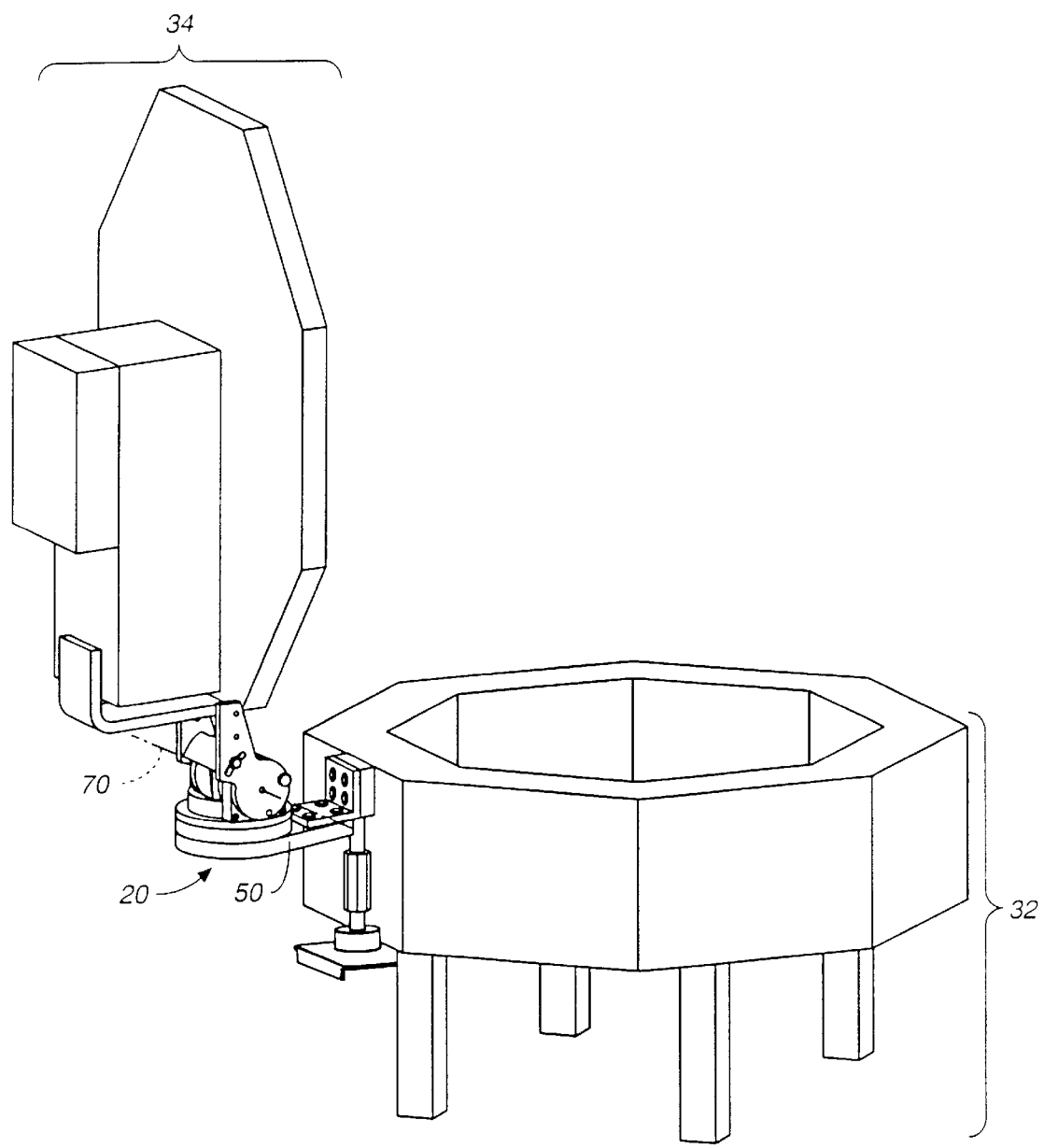
FIG._1B

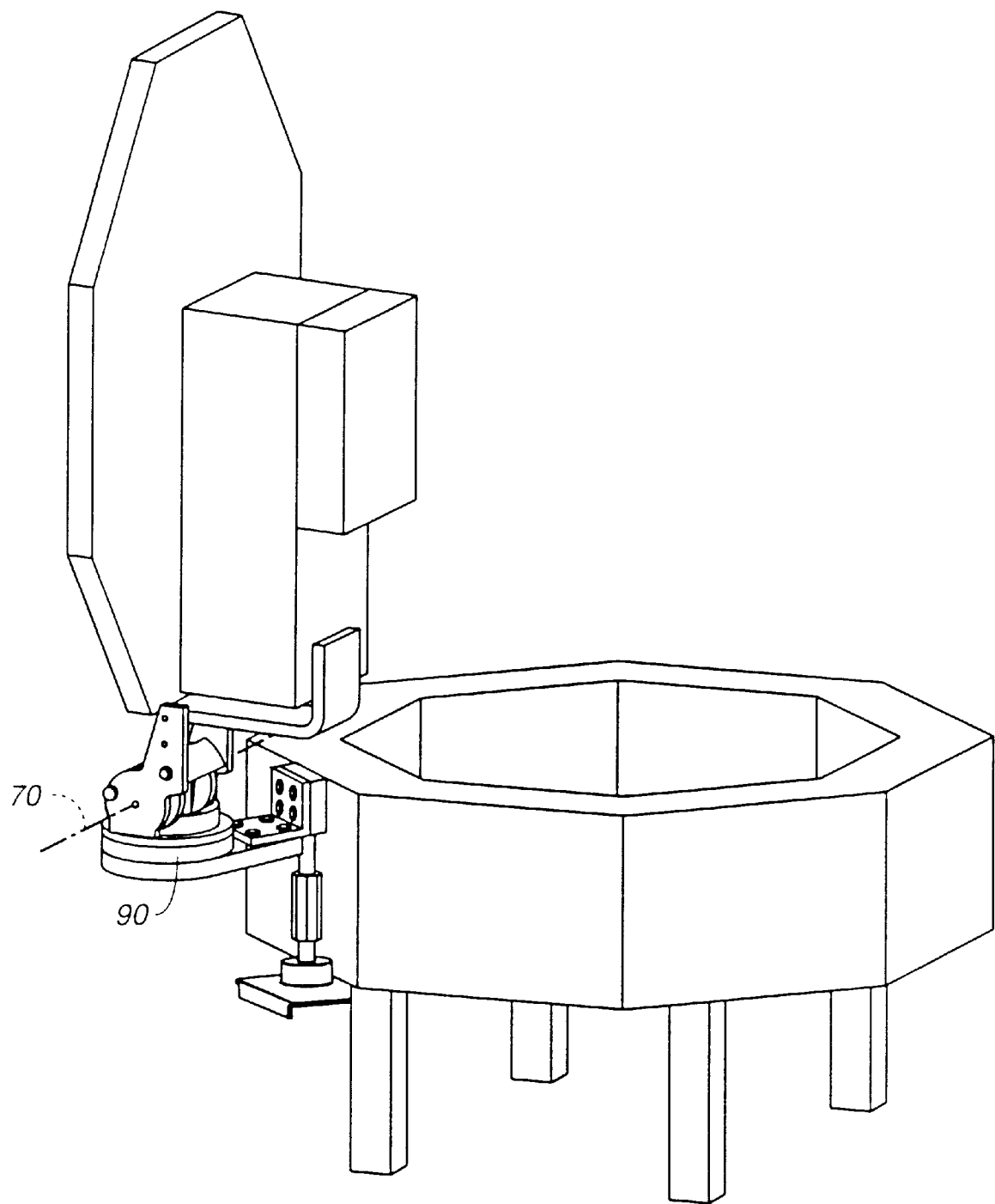
FIG._1C

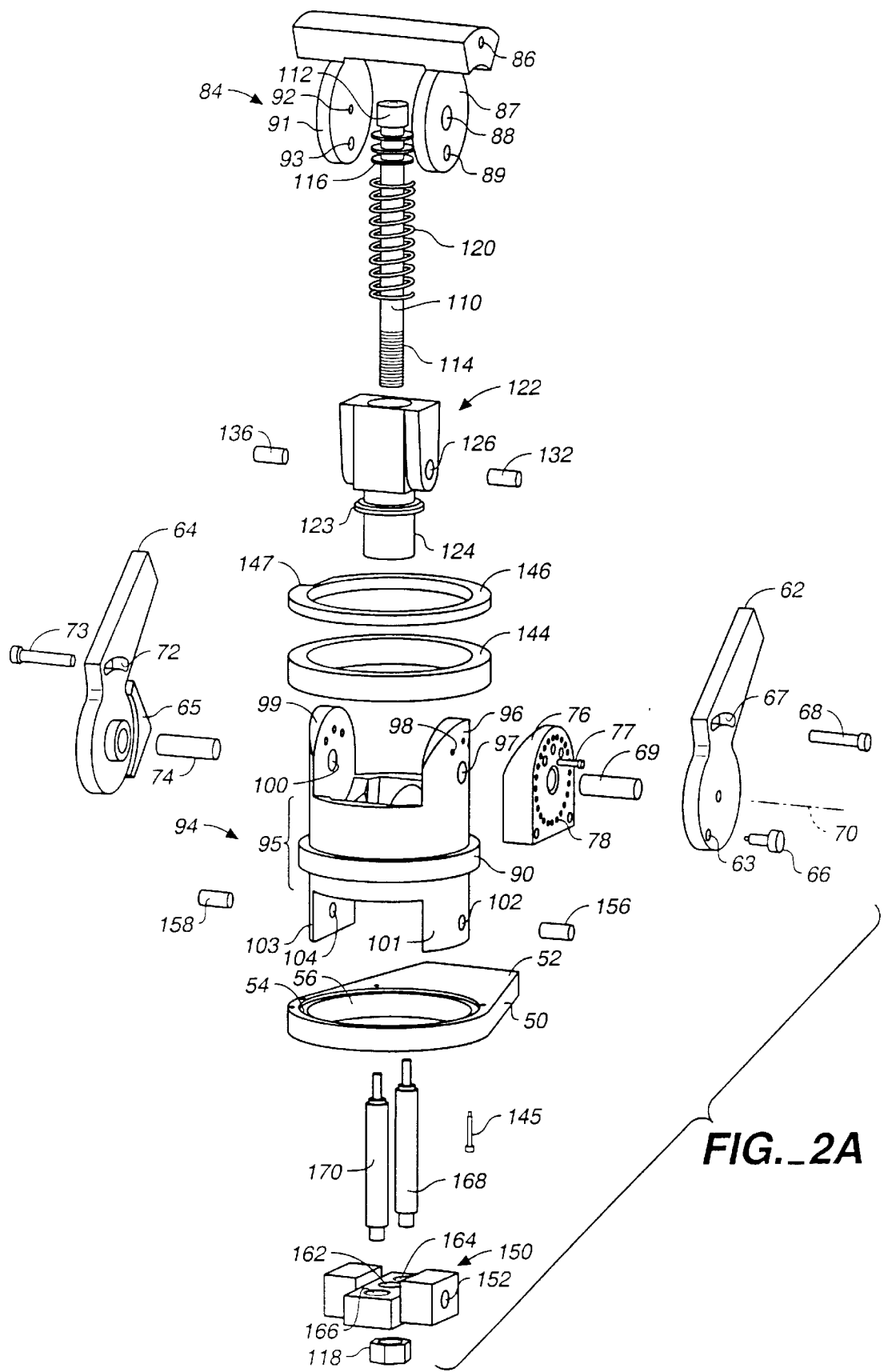
FIG._2A

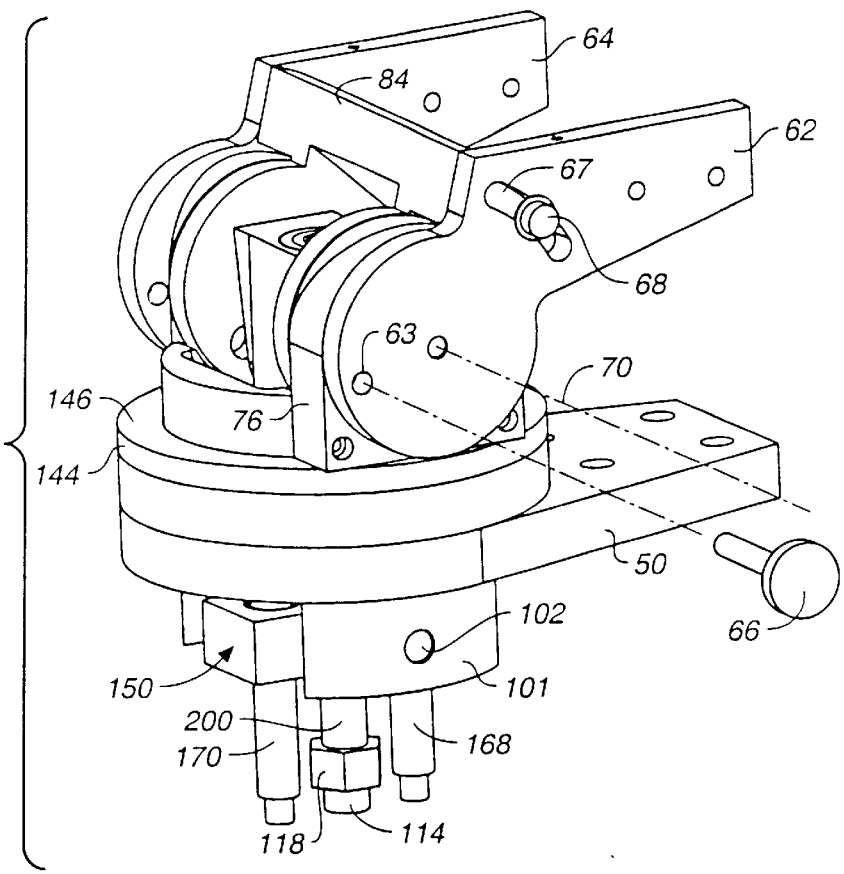
FIG._2B
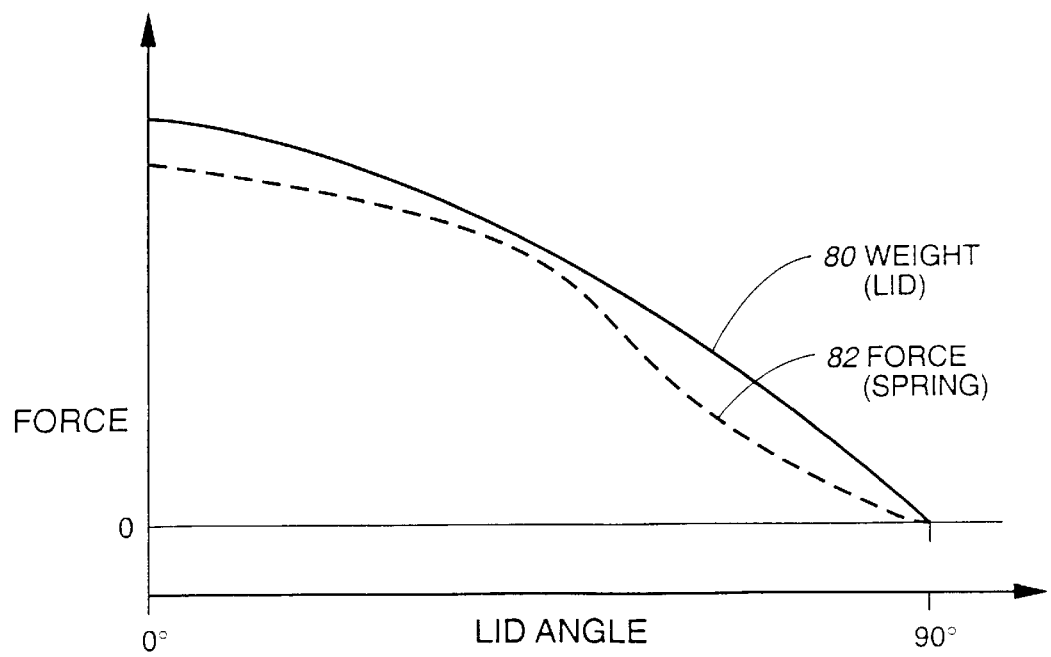
FIG._4

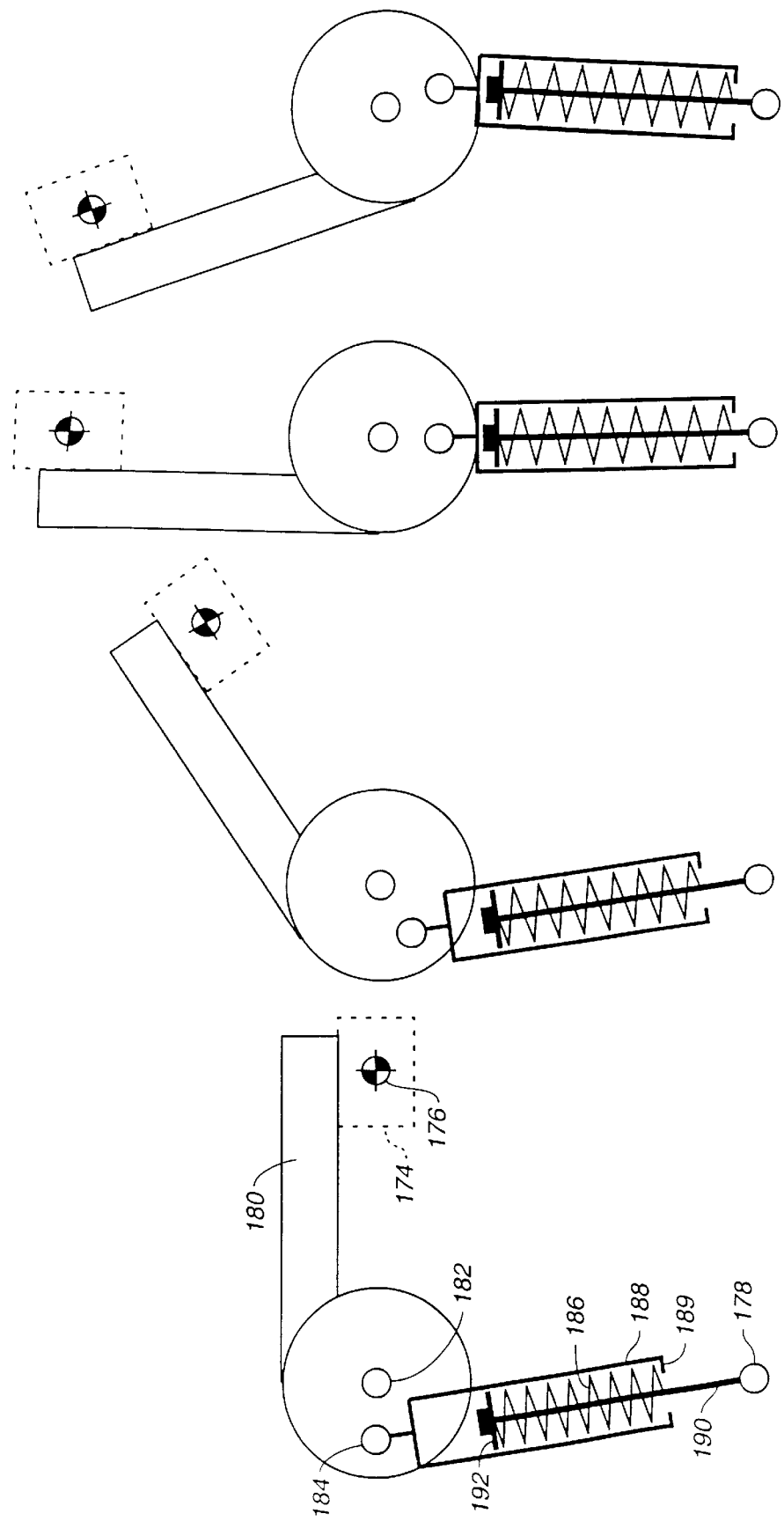

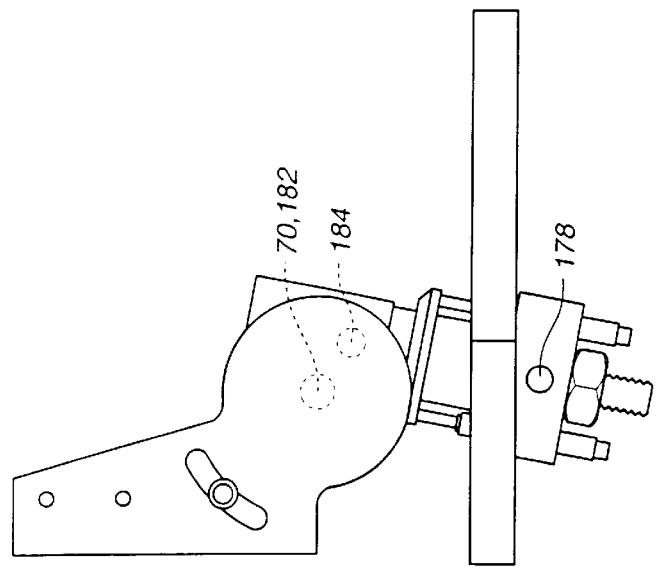
FIG._7
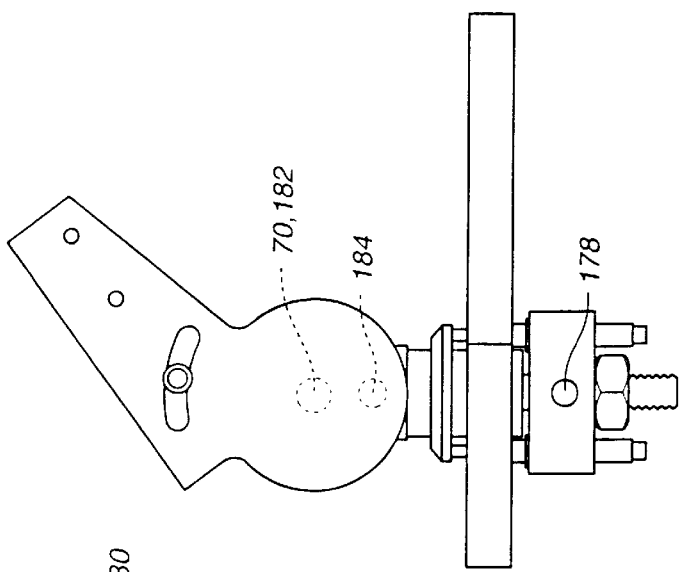
FIG._6
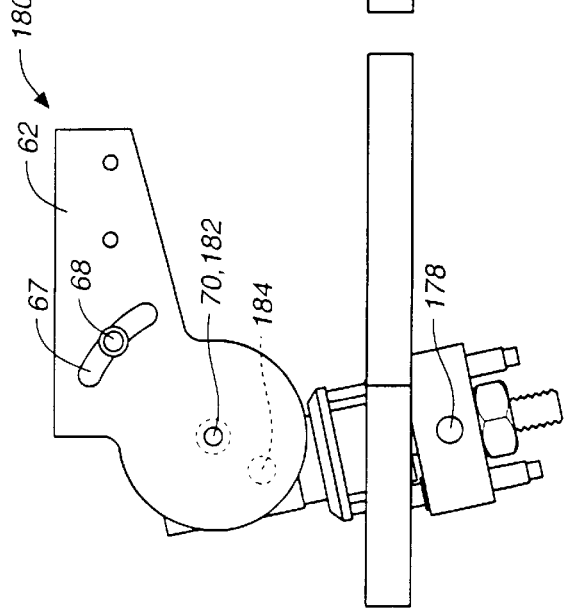
FIG._5

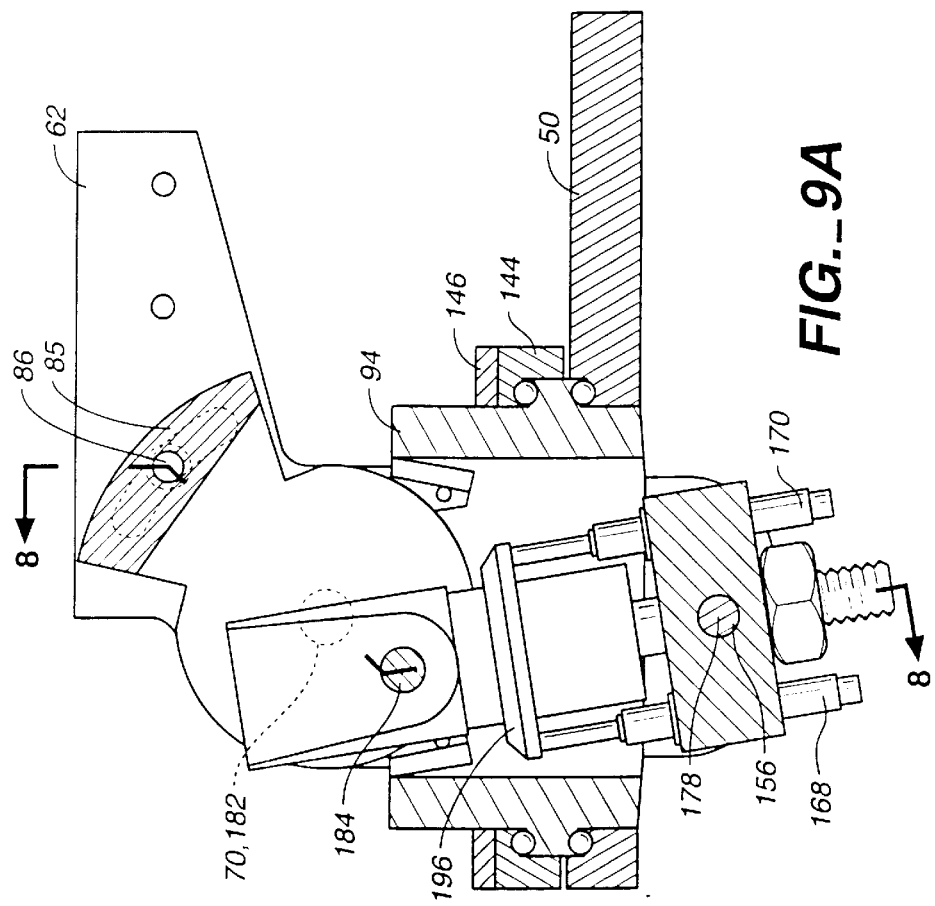
FIG._9A
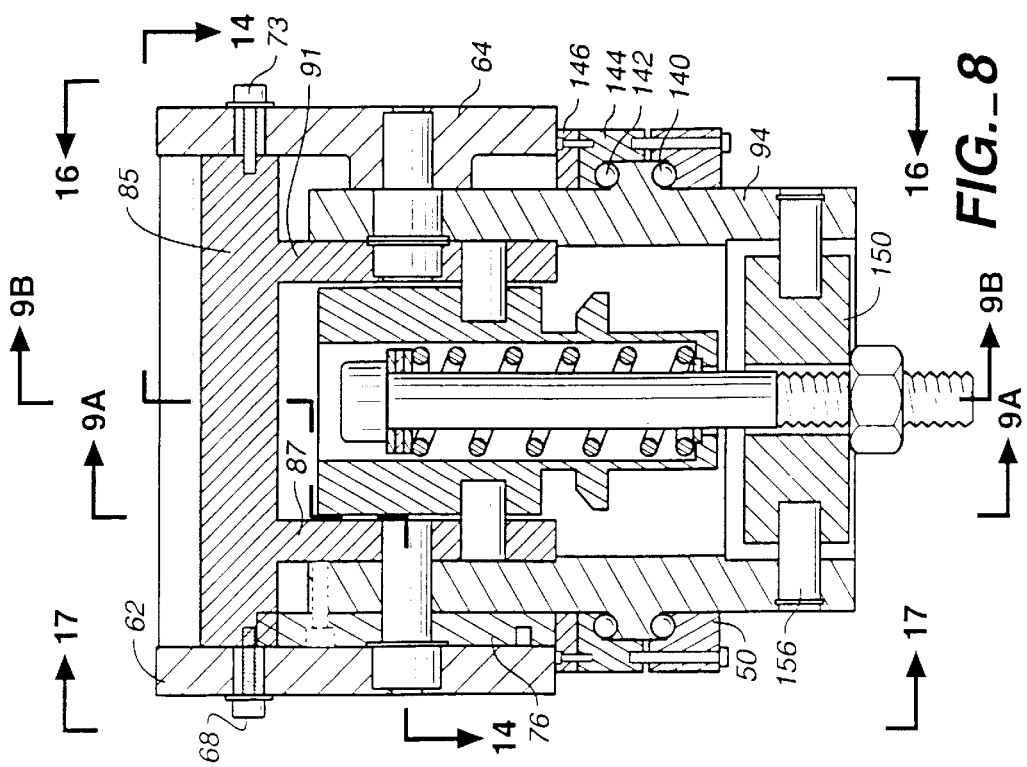
FIG._8

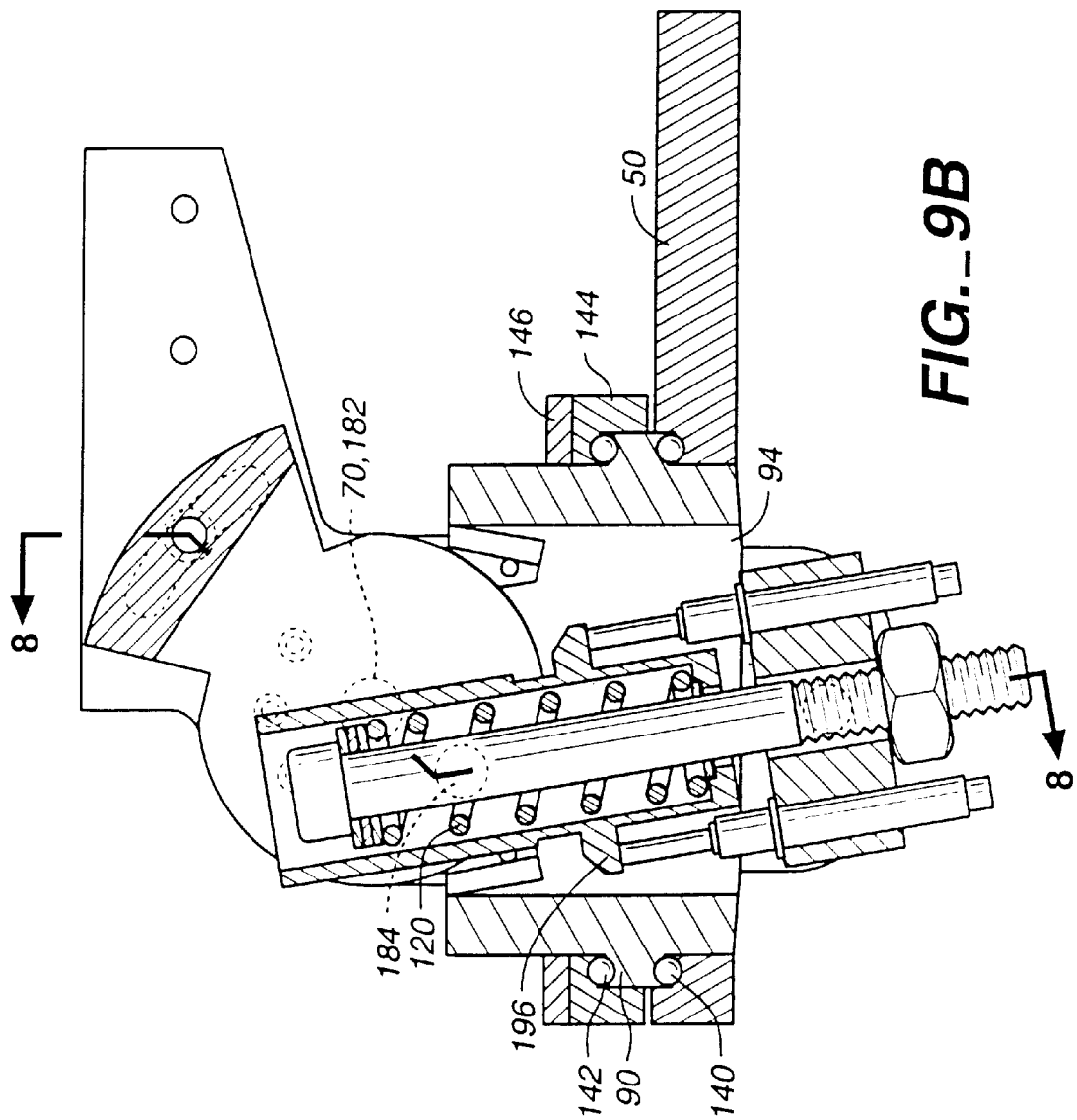

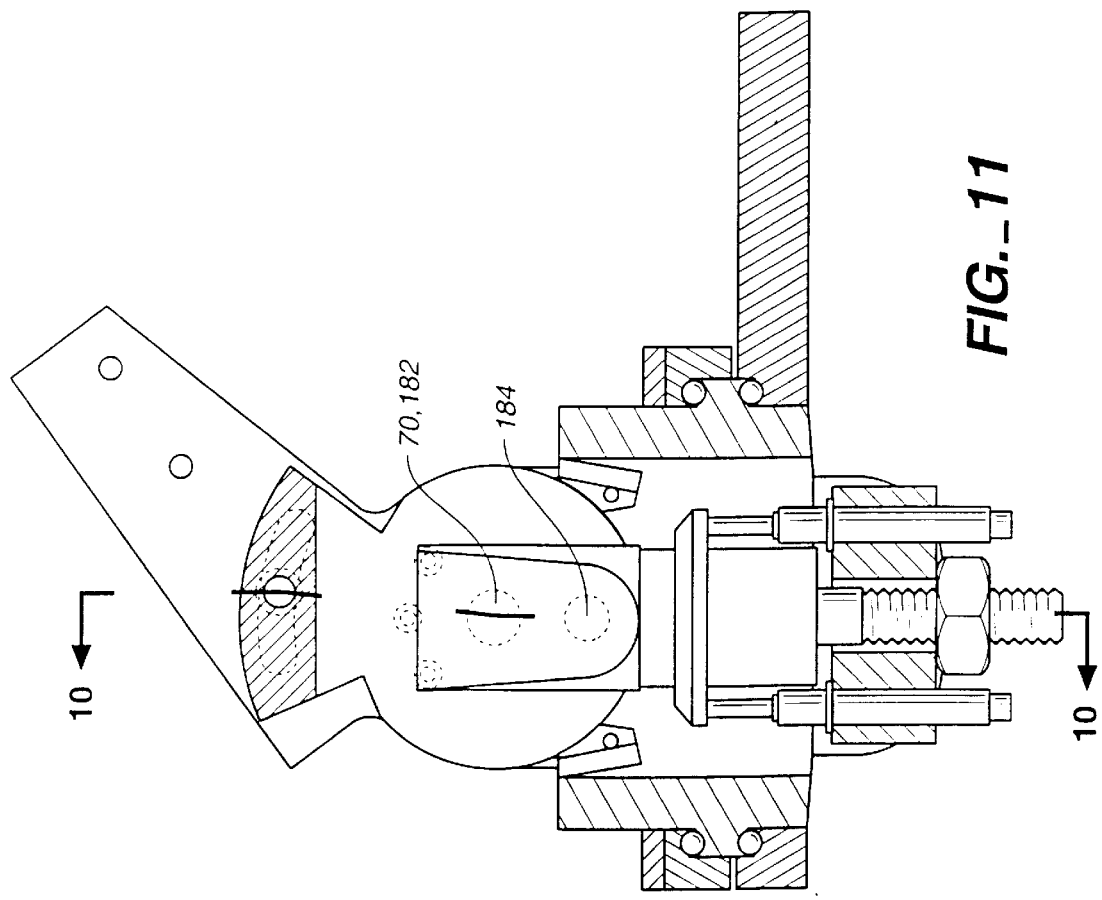
FIG._11
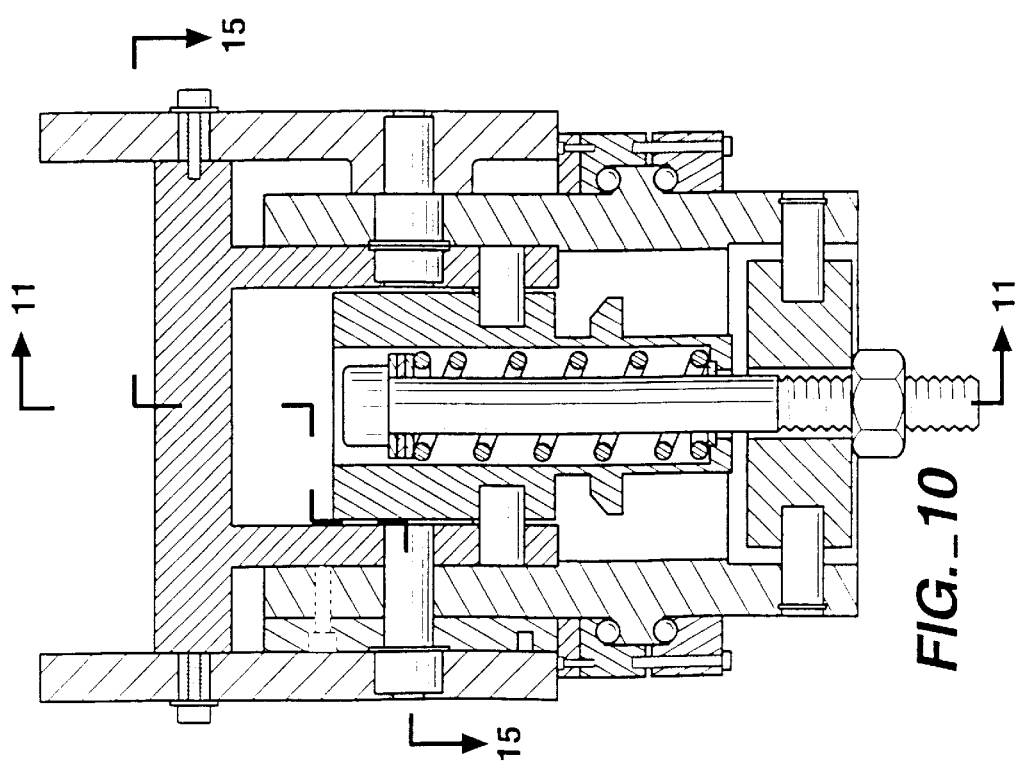
FIG._10

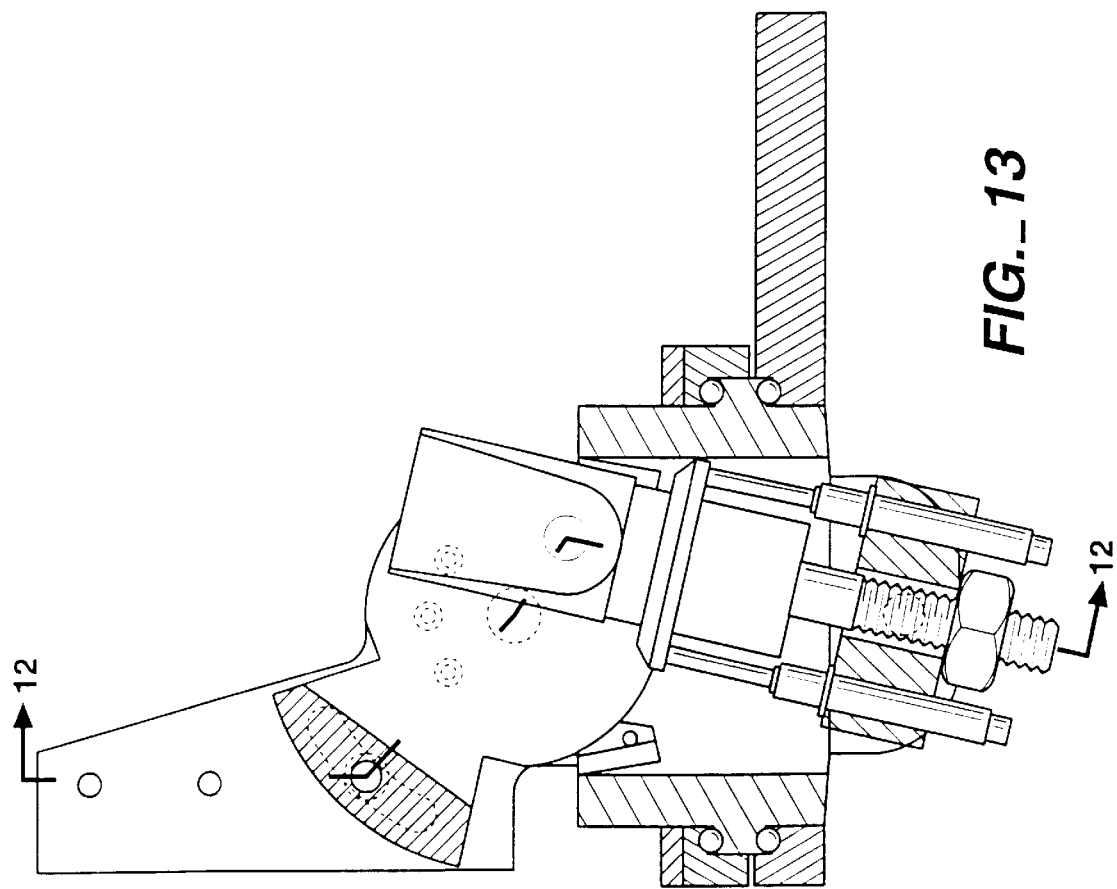
FIG.__13
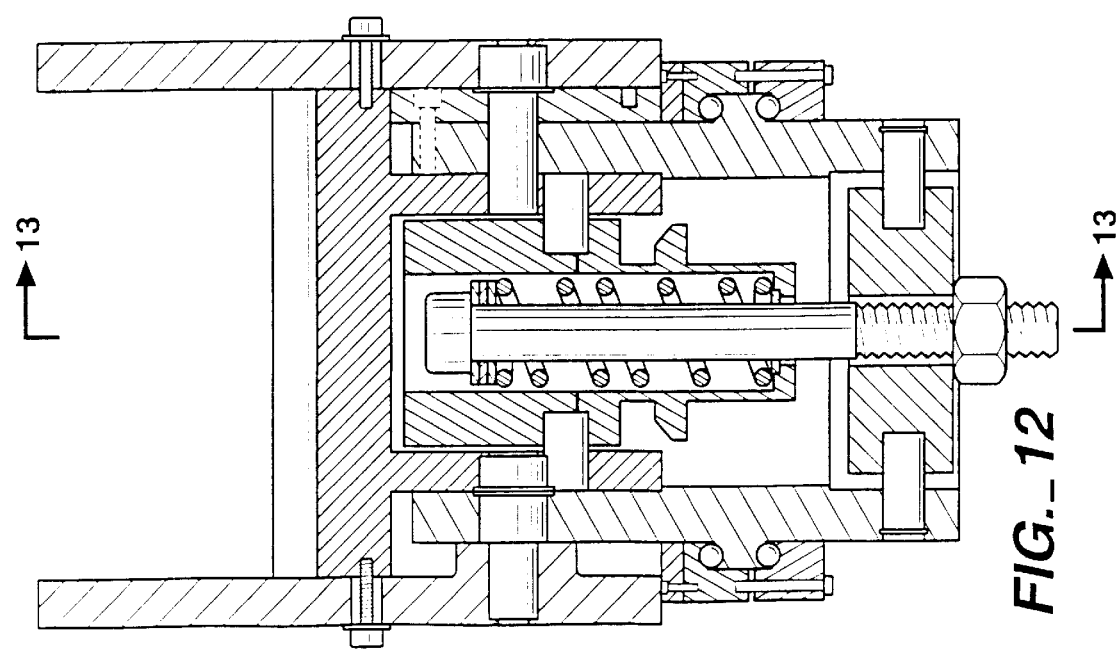
FIG.__12

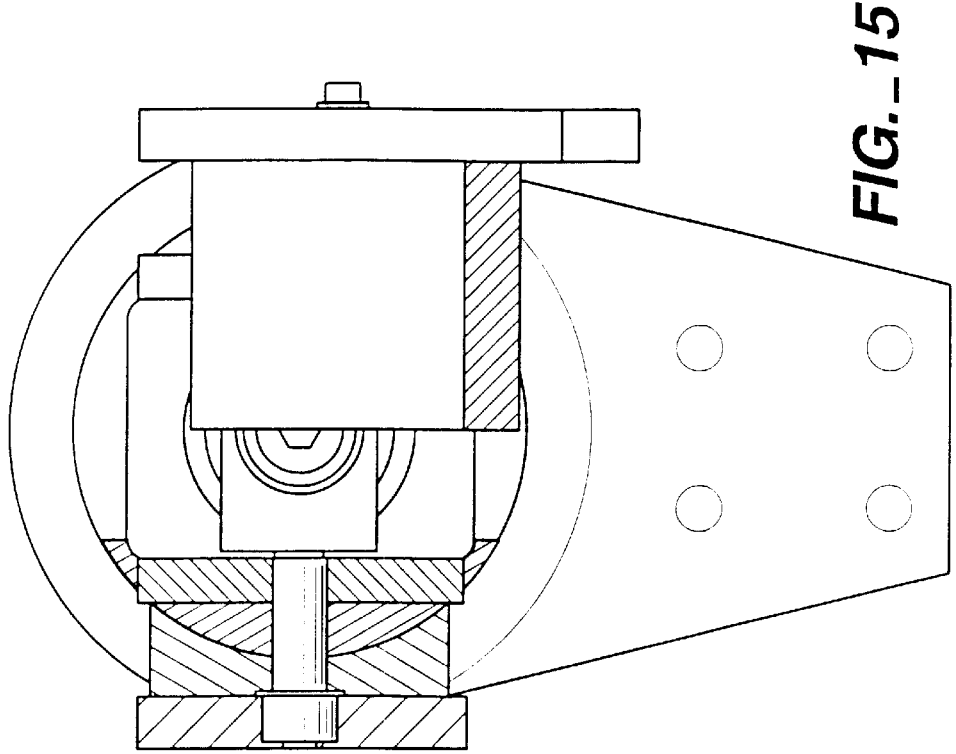
FIG._15
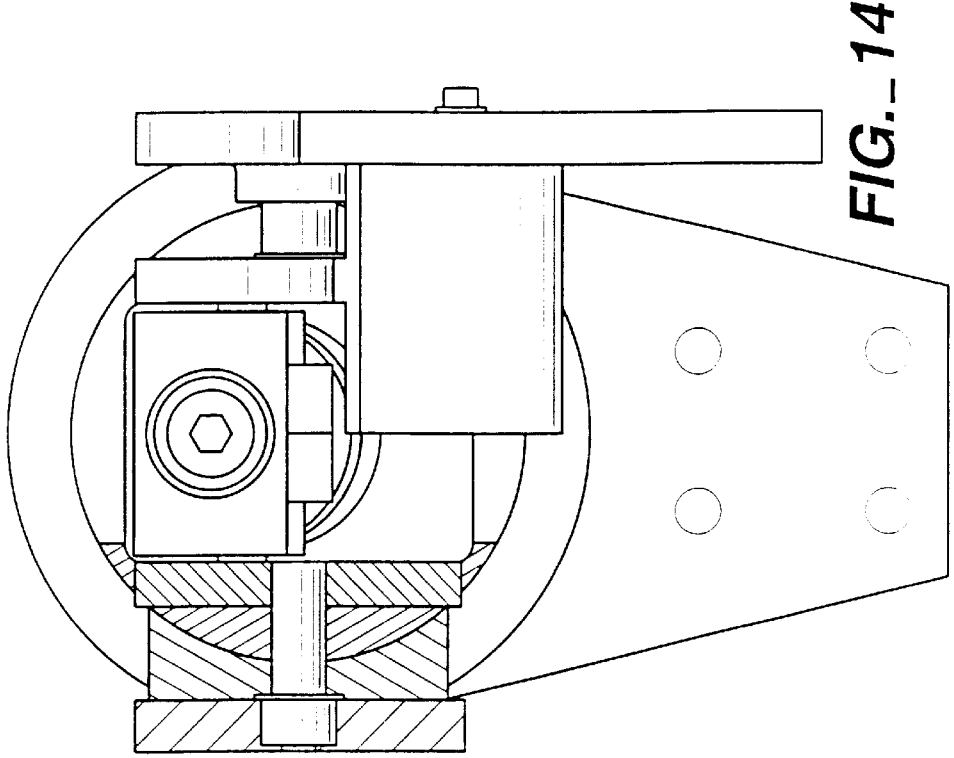
FIG._14

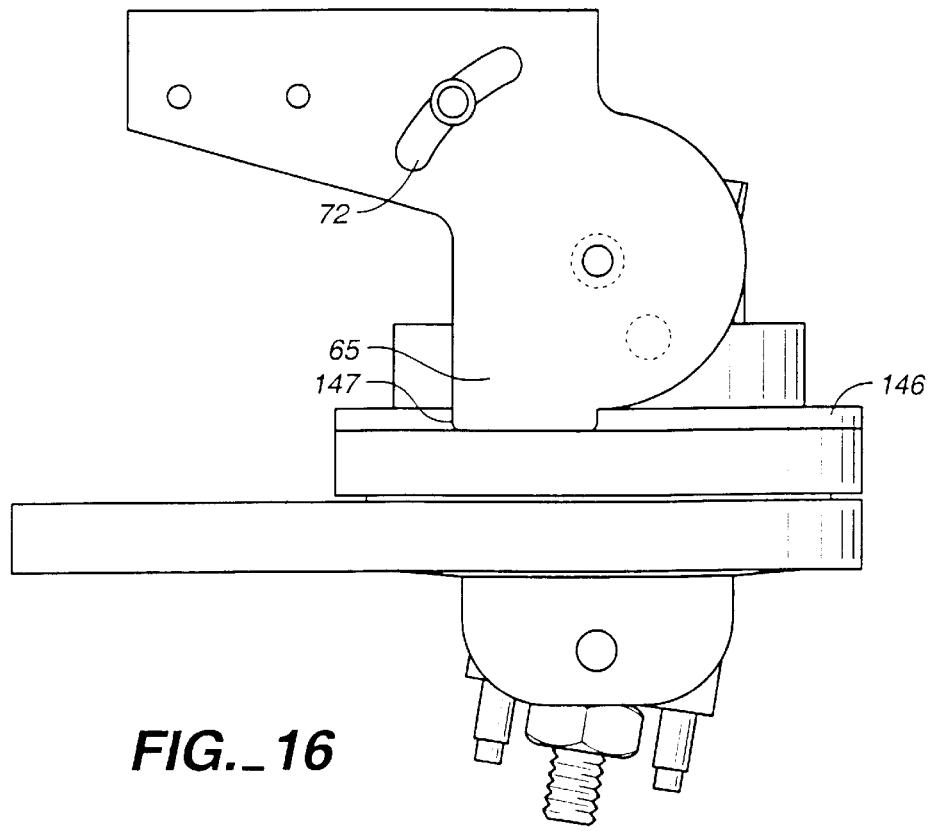
FIG._16
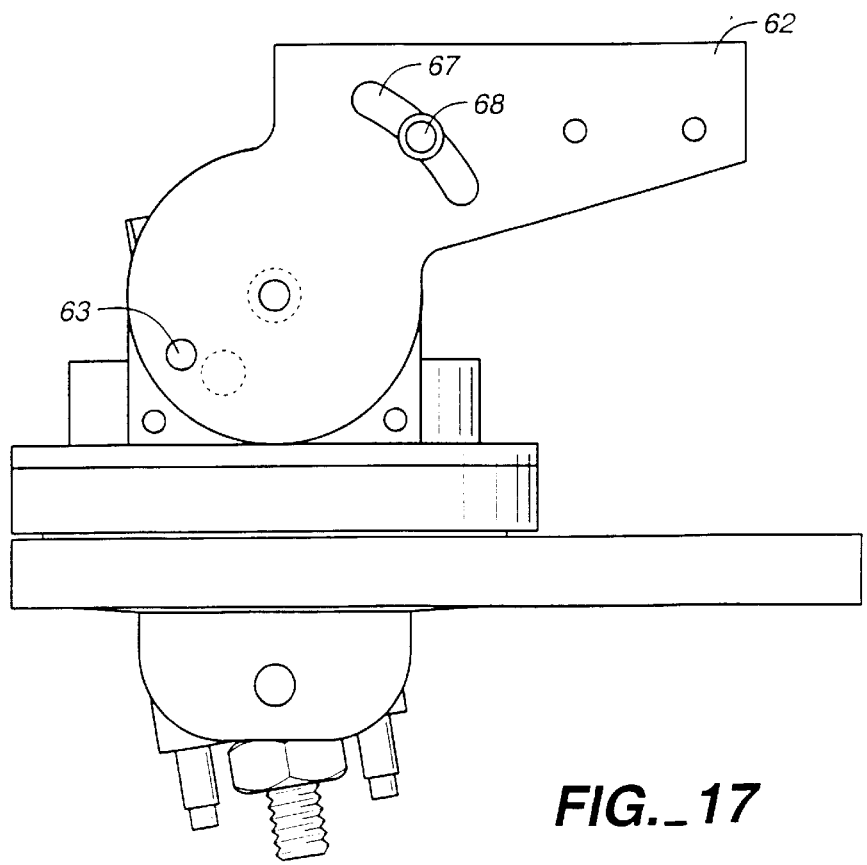
FIG._17

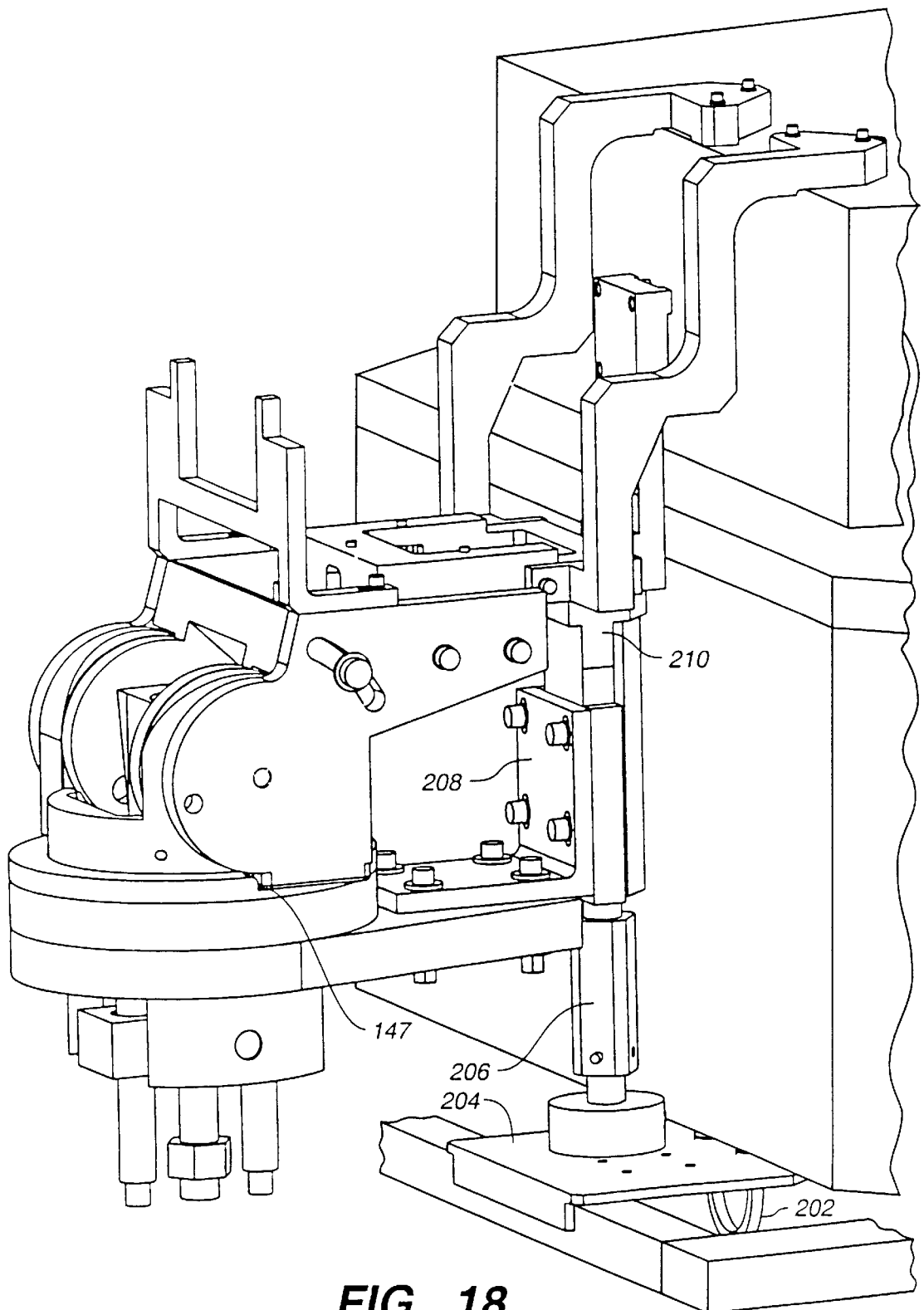
FIG._18

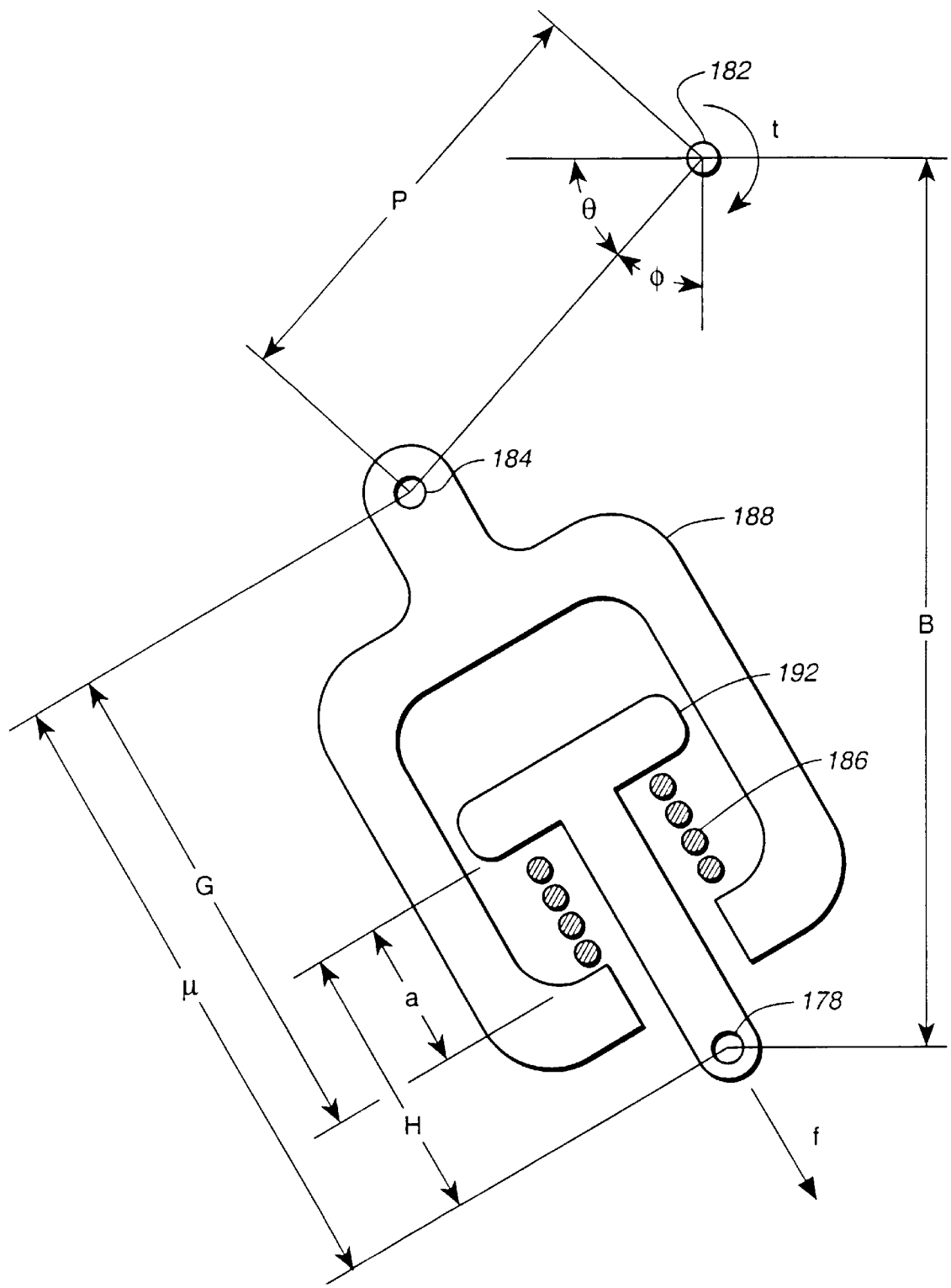
FIG._19

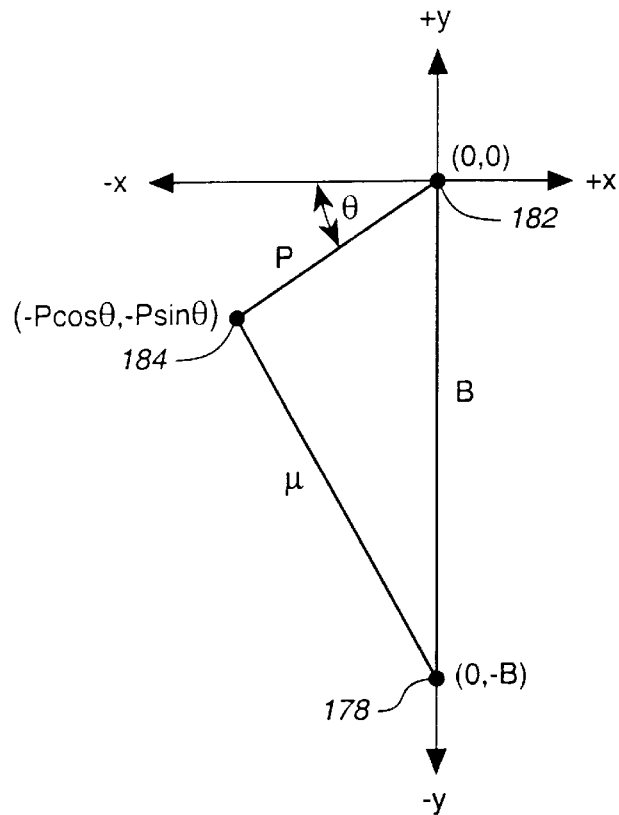
FIG._20
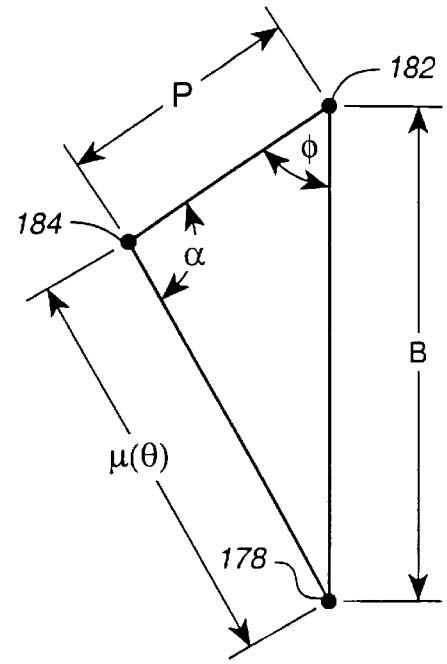
FIG._21
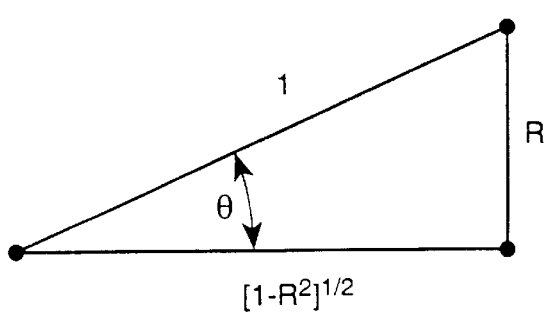
FIG._22
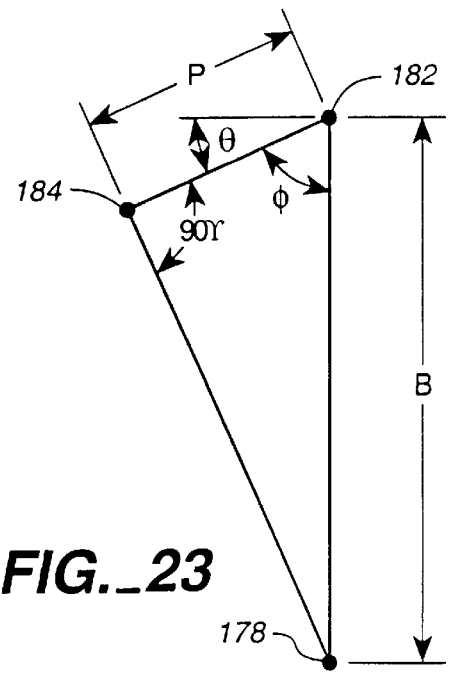
FIG._23

SIMPLE LIFT ASSIST MODULE

FIELD OF THE INVENTION

This invention relates to devices which assist in lifting loads, in general, and in particular to lift devices which assist in reducing the weight of a moveable portion of a machine by using a spring force to counterbalance the weight of moveable portion of the machine, where the moveable portion of the machine is the cover or upper portion of a processing vessel.

BACKGROUND OF THE INVENTION

The lifting of heavy pieces of industrial equipment is a well known and never-ending problem, well known to those who have worked in large industrial plants. Over the years various devices have been developed to assist operators and maintenance workers in lifting chores and prevent back and other muscular-skeletal injuries. These prior art devices include overhead cranes, jib cranes, portable cranes, various kinds of floor jacks, and counterweighted and spring loaded beam-type supports. In recent years the development and use of larger and larger semiconductor substrates has caused the size of semiconductor processing equipment to increase. As the size of the equipment increases the weight of components which occasionally need to be removed for servicing also increases. However, unlike the common industrial plant where floor space is usually readily available or designed to accommodate particular serviceability and maintenance requirements, and where the shop environment is controlled at most by enclosing the machine in a building that has doors which can be closed, the semiconductor processing industry has for the most part already constructed and invested heavily in substrate processing facilities where the distance between the centerlines of adjacent equipment is fixed. Thus there is a fixed floor space, further the environment in rooms surrounding the semiconductor processing equipment is tightly controlled, and low to high grade clean rooms are sometimes surround the processing equipment. When larger sized equipment is installed in such facilities the tendency is to wedge the equipment in, thus narrowing the aisles between machine bays and reducing the space available in which a lift assisting device can be used. Further because of the cleanliness requirement the general practice is to avoid having any equipment items permanently positioned over an processing chamber, to avoid the possibility of dust or other particles which may have settled on such an object from being accidentally displaced, such that dust or particles fall in to an open processing chamber. This leaves the possibility of a portable jib crane, which is moved in and out of the clean room every time it is used, again increasing the chance of particle contamination. Another possibility is the use of a counterweight type device pivoting around a hinge point. In this arrangement there is no structure hanging over the processing chamber, however in this arrangement a counterweight would have to stick out into the space between processing chambers and further reduce the pathway available to process operators and service technicians.

A device which avoids the drawbacks of current devices and occupies only a small area is needed to effectively service the next generation of substrate processing machines which are being tightly fit into spaces previously intended for much smaller machines.

SUMMARY OF THE INVENTION

The shortcoming and difficulties of the prior art are reduced or solved by use of a configuration according to the present invention. A configuration according to the invention includes a hinged weight support apparatus having: a tubular pan body fixed to a base; a load arm rotatably fixed to an upper tilt axis of the pan body; where a weight support portion of the load arm extends in a first direction from the upper tilt axis; where a crank arm portion of the load arm extends in a second direction, approximately opposite to the first direction, from the upper tilt axis to a crank pin axis located away from the upper tilt axis by a crankarm distance; a spring element having an adjustable spring tension, wherein the spring element has a bottom end rotatably fixed to a lower spring support member of the pan body, the spring element passing through a portion of the tubular pan body and having a top end rotatably fixed to a crank pin axis member.

The tubular pan body may be fixed to the base through a rotatable connection and may have a central axis about which the pan body is rotatable.

The base may be a plate and the tubular pan body may extend through the plate with a bearing flange on the outside of the pan body.

The spring element may include: a coil spring having a first end and a second end; a central rod that extends through the coils of the spring, where a spring end of the rod connects to a spring flange at a first end of the spring, and a free end of the rod comprises a either of the bottom end of the spring element which is rotatably fixed to the lower spring support member or the top end of the spring element which is rotatably fixed to a crank pin axis member, and a spring peripheral tube surrounding the coils of the spring, where the peripheral tube at a spring end has an inwardly extending flange to engage the ends of the coil at the second end of the spring as the spring peripheral tube is urged toward the first end of the spring, wherein a free end of the spring peripheral tube includes the other of either of the bottom end of the spring element which is rotatably fixed to the lower spring support member or the top end of the spring element which is rotatably fixed to a crank pin axis member.

The spring element may be positioned between the internal tubular walls of the pan body such that a bottom end of the spring element is connected to pin and device elements which is approximately centered between the sidewalls of the pan member at the bottom end of the pan member and such that a top end of the spring element is connected to pin and device elements connected to the crank arm axis of the load arm, where the elements are approximately centered between the sidewalls of the pan member at the upper end of the pan member.

The load arm according to the invention is capable of rotating more than ninety degrees and as the crankarm rotates the crank pin axis moves to cause the spring element to shorten and then to extend, such that the arm is considered to move over-center.

The invention includes a load arm stop which can be activated at a predetermined number of discrete load arm positions and a load arm travel limit which prevents the load arm from fully descending to a fully lowered position except at a predetermined pan angle position.

The adjustment of the spring tension of the spring member requires only the rotation of a central rod relative to a central rod nut and where a tilt angle between the weight support portion of the load arm and the crank arm portion of the load arm is adjustable by loosening at least one clamp bolt, changing the tilt angle between the weight support portion and the crank arm portion by moving the clamp bolt in a slot and re-clamping the at least one clamp bolt.

BRIEF DESCRIPTION OF THE DRAWINGS

FIGS. 1A, 1B, and 1C, are perspective views of a processing chamber assembly and its cover assembly, with a lifting device according to the invention attached to a cover and side thereof, in a closed position, with the cover assembly in a raised position, and with the cover assembly in a raised and rotated position, respectively;

FIGS. 2A and 2B are perspective exploded and assembled views of a lift device according to the invention, FIGS. 3A, 3B, 3C, and 3D are progressive schematic views of the interaction of the lift device components as the lift device is rotated from a position where its support arm is horizontally extended, through a position where the lift device support arm is vertically extended, and, to a position where the support arm is tilted back over center;

FIG. 4, is a plot of support arm angle versus force comparing the force necessary to support the weight of a lid (cover assembly) of a processing chamber as the lid pivots from a closed position (shown as zero degrees) with an opposing force necessary to support the weight of the lid, generated by one spring tension setting of a lifting device according to the invention;

FIGS. 5, 6, and 7 show cutaway side views of a lifting device according to the invention showing the progressive motion in practice of a load arm, tracking the schematic FIGS. of 3A through 3C, the pan tubular body in which the load arm pivots is cutaway (not shown);

FIG. 8, shows a hybrid end cross sectional view showing the active elements of a lifting device according to the invention in a lid closed position as shown in relation to one another of the lifting device as shown in FIGS. 9A and 9B (the view is a hybrid because the full length of the spring member is shown while the cut line shows the cut through the spring member diverging from the spring member at the crank arm pivot axis);

FIGS. 9A and 9B show two side cross sectional views, one showing the outside of the spring device located in the central core of the pan rotation body, the second being cut through to the center of the spring device of the lifting device in the closed position of the load arm 9for example as shown in FIG. 5;

FIG. 10, shows a hybrid end cross sectional view showing the active elements of a lifting device according to the invention in a lid partially open position as shown in relation to one another of the lifting device as shown in FIG. 11 (the view is a hybrid because the full length of the spring member is shown while the cut line shows the cut through the spring member diverging from the spring member at the crank arm pivot axis);

FIG. 11 shows a side cross sectional view showing the outside of the spring device located in the central core of the pan rotation body of the lifting device in a partially open position of the load arm ,for example as shown in FIG. 6;

FIG. 12, shows a hybrid end cross sectional view showing the active elements of a lifting device according to the invention in a lid fully open position as shown in relation to one another of the lifting device as shown in FIG. 13 (the view is a hybrid because the full length of the spring member is shown while the cut line shows the cut through the spring member diverging from the spring member at the crank arm pivot axis);

FIG. 13 shows a side cross sectional view showing the outside of the spring device located in the central core of the pan rotation body of the lifting device in a fully open position of the load arm, for example as shown in FIG. 7;

FIG. 14 is a partial cross sectional top view of the lifting device according to the invention taken at 14—14 of FIG. 8, FIG. 15 is a partial cross sectional top view of the lifting device according to the invention taken at 15—15 of FIG. 10, FIG. 16 is a side view of the lifting device of FIG. 8, taken at 16—16;

FIG. 17 is a side view of the lifting device of FIG. 8, taken at 17—17; and FIG. 18 is a perspective view of the lifting device according to the invention with its base plate fixed through mounting hardware to a process chamber base engaging structure, with a top (lid or cover) engaging extension extending from the upper arms of the lifting device.

DETAILED DESCRIPTION

A lifting device assembly 20 according to the invention is shown attached to a process chamber assembly 30 in FIG. 1A. A base 50 of the lifting device assembly 20 is fixed to a lower body portion 32 of the process chamber assembly 30. A load arm assembly 60 of the lifting device assembly 20 is fixed to a lid assembly (top, upper portion) 34 of the process chamber assembly 30. In FIG. 1A the lid assembly 34 is shown in what is considered a closed position. In this configuration, the lifting device assembly 20 causes the load arm assembly 60 to exert an force on the lid assembly 34, urging the lid assembly 34 upwards to rotate around a load arm pivot axis 70 of the lifting device assembly. The force urging the lid assembly 34 upwards is less than the force due to the weight of the lid assembly urging the lid assembly downwards to a closed position, so that the lid remains closed and moves to a closed position if allowed to rotate freely.

FIG. 1B shows the lifting device assembly 20 and the lid assembly 34 attached to it in a fully raised position (ninety degrees from the closed position). This position may also be considered an open position. In this position, as well as all positions intermediate the open and closed positions the lid assembly position is not force balanced by the force from the lift device assembly 20 alone. The closing force of the lid assembly 34 due to its weight, is greater that the opening force generated by the lifting device assembly 20. A graphical example showing a comparison of the closing force due to the weight of the lid assembly 34 and the opening force due to the lifting device assembly 20 as the lid assembly pivots about the load arm pivot axis 70 is shown in FIG. 4. The graph shows a comparison between the absolute value of the opening and closing force components. The closing force being represented by the solid line 80 and the opening force being represented by the dashed line 82. The vertical distance between the two lines 80, 82 at any angle, represents the excess closing force that is available to move the lid assembly 34 to a closed position at that angle. The magnitude of the excess closing force, at any particular angle, is equal to the additional opening force that needs to be applied to the lid assembly 34 to maintain its position. For example, when it is desired to hold the lid assembly 34 in a particular angular orientation, then the opening force that needs to be generated by a tilt stop is the opening force represented by the distance between the two plots 80, 82 at any particular angle. Similarly when it is desired to raise the lid assembly 34, an operator or service technician will be required to generate an opening force slightly greater than the force represented by the distance between the two plots 80, 82. Thus the force to raise the lid assembly to pivot it about a hinge (pivot) axis will be much reduced from the force required to raise the lid assembly 34 without such a lifting device assembly 20. In this way the chance of potential personal injury is reduced. A tilt stop mechanism is provided to hold the lid assembly 34 at a particular angle in an open or partially open position (the details of the tilt stop mechanism are discussed below).

Once the lid assembly 34 is tilted up about the load arm pivot axis 70 as shown in FIG. 1B (the terms pan and tilt, will be used to describe motion about a vertical axis and a horizontal axis of the lifting device assembly, respectively, pan being the common term in photography to describe a camera movement parallel to the horizon, while tilt is the term which describes camera motion above and below the horizon), the lifting device assembly 20 can be locked in the up position. Then a pan body 94 and portions of the lifting device assembly 20 supported by the pan body 94 along with the attached lid assembly 34 can be rotated, so that the lid assembly is out of the way, and it is off the floor. For example as pictured in FIG. 1C.

A set of schematic drawings showing the 2-dimensional progressive rotation of the a load arm are shown in FIGS. 3A, 3B, 3C, and 3D. As can be seen in FIG. 3A, a load 174 is fixed to a load arm 180 which is rotatably fixed to an arm pivot axis 182. The center of gravity of the load arm is represented by the target point 176. The weight of the load 174 is opposed by a spring mechanism assembly connected between a crank pivot axis 184 and a lower spring pivot 178. In the configuration shown, a compression spring 186 is compressed and expanded, as the center of gravity 176 moves farther and closer to the arm pivot axis 182. A connection rod 190 extends through the center of the spring 186. The top end of the rod engages a spring flange 192 to press the top of the spring 186 down. A spring tube 188 surrounding the spring 186 is connected at its upper end to the crank pivot axis 184 and has an inwardly extending flange 189 at its bottom end to press upwardly on the lower end of the spring 186. As can be seen from the representations of progressive motion illustrated in FIGS. 3A through 3D, the spring moves from a most compressed arrangement in FIG. 3A to a least compressed arrangement in FIG. 3C, and has can even go past center such that over center motion again starts to compress the spring 186.

The values of the plots 80, 82 shown in FIG. 4 can be generated and result from an understanding of the geometry of the pivoting pieces (for example those shown in FIGS. 3A to 3D) and how the forces on those pivoting pieces change as a process chamber lid is raised.

A schematic representation whose components correlate to the schematic drawings of FIGS. 3A through 3D are provided to explain the force versus angle curves shown in FIG. 4 is shown in FIG. 19. The item numbers of the pivoting items and pivot points correlate to the item numbers shown in FIGS. 3A through 3D.

FIGS. 20 through 23 are graphical representations which aid in understanding the dimensional relationships which correlate to the force and angle values as shown in FIG. 4. In the Equations below:

k=spring constant
=spring free length
f=force generated by spring
t=torque

From FIGS. 20 and 21:

$$\mu(\theta)=[(P\cos\theta)^2+(B-P\sin\theta)^2]^{1/2} \quad \text{EQ. 1}$$

From FIG. 19:

$$a(\theta)=H-[\mu(\theta)-G]$$
$$a(\theta)=H+G-\mu(\theta) \quad \text{EQ. 2}$$

From FIG. 21

$$\frac{\sin\alpha}{B} = \frac{\sin\phi}{\mu(\theta)}$$

$$\sin\alpha = \frac{B\sin\theta}{\mu(\theta)}$$

$$\alpha(\theta) = \sin^{-1}\left[\frac{B\sin[90-\theta]}{\mu(\theta)}\right] \quad \text{EQ. 3}$$

$$f(\theta) = k[E - a(\theta)] \quad \text{EQ. 4}$$

$$t(\theta) = Pf(\theta)\sin[\alpha(\theta)] \quad \text{EQ. 5}$$

Then to find $\sin^{-1}$ (R) as shown in FIG. 22.

$$\theta = \sin^{-1}(R)$$

$$\theta = \tan^{-1}\left[\frac{R}{\sqrt{1-R^2}}\right]$$

$$\sin^{-1}R = \tan^{-1}\left[\frac{R}{\sqrt{1-R^2}}\right]$$

And referring now to FIG. 23:

$$\phi = \sin^{-1}\left(\frac{P}{B}\right)$$

$$\theta_{critical} = \frac{\pi}{2} - \left[\sin^{-1}\left(\frac{P}{B}\right)\right]$$

$$\phi_{critical} = \pi/2 - [\sin^{-1}(P/B)]$$

The Equation labeling with numbers are provided for informational purposes only.

The details of the lifting device assembly 20 are shown in FIGS. 2A and 2B in exploded and assembled views, respectively. The lifting device assembly 20 is supported from a base 50 which forms an integral part of the device 20 and has a flange portion 52 that is connected very solidly to a support structure (not shown). The base includes an opening 56 which receives and surrounds a lower portion of a tubular body section 95 of the pan body 94. The upper surface of the base 50 surrounding the opening 56 includes a ball bearing race groove 54. A close up of balls 140 sitting in the base's ball bearing race groove 54 is shown in FIG. 8. The tubular body section 95 of the pan body 94 includes a bearing flange 90 having integral upper and lower ball bearing race grooves as can be seen in FIG. 9B where there are sets of bearing balls 140, 142 which roll in the lower and upper grooves, respectively. An upper bearing ring 144 captures the upper set of bearing balls in its own bearing ball groove and is firmly fixed to the base 50 using bolts or screws 145. The bearing flange 90 of the pan body 94 is thereby captured between two sets of rolling balls 140, 142, the ball bearings are in turn captured by the base 50 on the bottom and the upper bearing ring 144 on the top. In this way the pan body 94 can bear large loads and still rotate easily with respect to the base 50.

A pan bearing angular tilt limit ring 146 is attached to the top of the upper pan bearing ring 144 and includes a depression 147 which mates with an alignment corner (stop) 65 of the left side arm 64, when the pan angle position of the pan body 94, is aligned with the location where the lid being supported should be lowered. Otherwise, if lowering (a tilting down) of the load arm assembly is attempted at a pan angle other than approximately the one where alignment is correct, a bottom of the alignment corner will create an interference condition between the alignment corner and the top of the pan bearing angular tilt limit ring 146.

An upper portion of the pan body 94 includes an upper right flange 96 and an upper left flange 99. The two flanges 96, 99 include, respective pivot holes 97, 100, which establish the load arm pivot axis 70 of a load arm assembly.

The load arm assembly includes all elements apart from the spring element that move as the load rotates about the load arm pivot axis 70. The load arm assembly includes a right side arm 62, a left side arm 64, a crank arm member 84, pivot pins 69, 74, bushings 71, 75 and bolts 68, 73 clamping the elements of the load arm assembly together into a single rotating unit. The right and left pivot pins 69, 74 each extend through the pivot holes 97, 100 in their respective upper right and left pan body flanges 96, 99 and inwardly into right and left pivot axis holes 88, 92 of the right and left crank arm flanges 87, 91 to support and provide a pivot axis for the crank arm member 84.

The right and left pivot pins 69, 74 also extend outward from the upper pan body flanges to support the right and left side arms 62, 64 at their pivot axes. A multi-position arm lock plate 76 is fixed to a portion of the right side of the tubular body section 95 and the outside of the upper right pan body flange 96 by at least one arm lock plate lock pin 77 between the upper right side pan body flange 96 and the right side arm 62. The multi-position arm lock plate 76 includes a number of lock holes (e.g., 78) positioned near the edge of the plate. The location of the lock holes, e.g., 78, is on the same bolt circle as a lock hole 63 in the right side arm 62. As the right side arm 62 rotates, the lock hole 63 comes into alignment with one of the lock holes, e.g., 78, at pre-set (approximately regular) intervals. At each position where the lock holes are aligned, a lock pin 66 can be inserted to lock the right arm and consequently the whole lock arm assembly in a fixed orientation with the tubular pan body 94. When the lock pin 66 is in place, a lid assembly (for example 34 as shown in FIG. 2) raised by a technician can be fixed in the raised position.

The crank arm member 84 includes right and left crank arm flanges 87, 91 which are integral with an arm connection bar 85. The ends of the arm connection bar 85 when assembled extend over the tops of the upper right and left pan body flanges 96, 99. The ends provide a clamping surface against which the right and left side arms 62, 64 by their respective arm tilt adjustment bolts 68, 73 are tightened. Each side arm (e.g., 62, 64) includes a tilt adjustment slot, e.g., 67, 72, which allows the angle between the side arms 62 and 64 and the crank arm member 84 to be adjusted as needed so that when the angular location of the center of gravity of the load being raised is above the pivot axis 70 the crank axis holes (e.g., 89, 93) can be adjusted to be directly below the pivot axis 70. This geometric adjustment allows the minimum opening and closing forces to be matched so that further force adjustments, if any are balanced irrespective of on which side of the pivot axis 70 the center of gravity 76 of the lid is tilting.

Right and left crank arm pins 132, 136 along with bushings (not shown) establish a crankarm axis as the pins 132, 136 connect between crankarm holes 89, 93 in the right and left crankarm flanges 87, 91 and crank axis holes 126, 128 in the sides of an upper portion of a spring compressor tube assembly 122. The lower portion 124 of the spring compressor tube assembly 122 is a tube with turned in flanges to press upwardly on the lower end of a compressor spring 120. A connecting rod (or bolt) 110 is configured to pass through the center of the spring 120. The head 112 of the rod 110 and a series of washers 116 are configured to engage an end of the upper portion of the spring 120 and press down on the top of the spring 120. The connecting rod 110 with the spring 120 surrounding is dropped into the top of the compressor tube assembly 122, so that the end of the connecting rod 110, passes through a hole in the end of the tube and through a central hole (connecting rod hole) 162 in a lower clevis 150. The threads 114 on the lower portion of the connecting rod 110 engage a rod nut 118 which is turned onto the rod below the lower clevis 150. In an assembled position the tension in the spring 120 and the force resulting from the tension in the spring is set and adjusted by tightening the rod nut 118 on the connecting rod 110. The head 112 of the rod 110 is an Allen head configuration so that even though the head 112 of the rod 110 is pulled farther into the tube section 124 of the compressor tube assembly 122 as the tension in the spring 120 is raised by tightening the nut 118, an Allen head configuration wrench easily accesses the bolt head 112 and prevents the connecting rod 110 from turning.

The lower clevis 150 to which the lower end of the connecting rod 110 is connected, acts as a fixed but rotatable anchor point for the lower end of the spring element. The upper end of the spring element, in this configuration is the crankarm axis pin location between the compressor tube assembly 122 and the crankarm holes 89, 93 of the crankarm member 84. The lower clevis 150 is rotatably fixed between spring pivot holes 102, 104 of a lower right pan body flange 101 and a lower left pan body flange 103 by and their bushings (not shown) and pivot pins 156, 158.

A pair of spring return hydraulic type dampers 168, 170 are mounted between each of two damper receiving openings 164, 166 in the lower clevis 150 and a damper receiving depressions in a damper flange 123 of the compressor tube assembly 122. The dampers 168, 170 prevent the lifting device assembly 20 from suddenly flying to an open position, in the instance where the tension spring was over tightened when the lid was in the down position, or from performing a rapid slapping maneuver (an opening) when the weight (lid) which is being supported or urged in an opening direction is released. Such a release will allowed stored energy to suddenly discharge by causing the lifting device assembly to suddenly move to an open position.

FIG. 2B shows an assembled configuration of the lifting device assembly 20 of FIG. 2A, except that a bottom compression tube 200, has been added between the rod nut 118 and the bottom of the lower clevis 150.

The configurations shown in FIGS. 3A through 3D and FIG. 4 have been discussed above.

FIGS. 5, 6, and 7 show side views of progressive motion of the load arm assembly as the load arm moves from a closed position to a fully open position, however the pan body 94 of FIGS. 2A and 2B has been removed for clarity. The item number identified in FIGS. 5, 6, and 7 also correlate to the item number shown in the schematic diagram if FIG. 3A so that the anchor and pivot points for the spring element and the tilt pivot axis 70, can be related to the same axis 182 shown in FIG. 3A. Because the spring enclosing tube (compressor tube assembly) 122 connects to the crank pivot axis 184 at the side of the tube, the amplified pivoting of the top end of the tube from one end to the other can be seen in the these Figures.

FIG. 8 shows a hybrid cross sectional view of the assembled lifting device assembly of FIG. 9A taken at 8—8. The construction of this arrangement has been earlier discussed in discussing the elements of the exploded device shown in FIG. 2A.

FIG. 9A shows a partial cut-away view of the lifting device assembly of FIG. 2A and 2B, with the pan body cut-away to show the spring device positioned in the central core of the pan body tube 94.

FIG. 9B repeats the view of FIG. 9A, except that in this view the tube surrounding the central spring core is also cut-away.

FIGS. 10 and 11 show end cross sectional and side views of the lifting device assembly according to the invention with the load arm in a partially open position. The relationship of elements can be tracked and compared to their positions in similar view at other opening conditions.

FIGS. 12 and 13 show end cross sectional and side views of the lifting device assembly according to the invention with the load arm in a fully open position. The relationship of elements can be tracked and compared to their positions in similar view at other opening conditions.

FIGS. 14 and 15 show partial cut-away top views of the lifting device assemblies of FIGS. 8 and 10 taken at 14—14 and 15—15, respectively. In comparison of these view it can clearly be seen the over center motion of the spring member which is passing through the center of the pan body 94.

FIGS. 16 and 17 show left and right side views of the lifting device assembly showing the tilt limit notch in the angular tilt limit ring 148 which mates with the alignment corner 65 of the left load arm 64.

FIG. 18 show a configuration of a support structure for the lifting device assembly according to the invention, showing structures that provide both vertical and horizontal (radial) incremental location adjustments so that a lid can be located nearly perfectly without any negative effects from the use of a lifting device assembly as described above.

The base flange of the lifting device assembly is connected to a base support 210 by a through a support angle iron 208. the Support angle iron 208 includes slotted holes which allows for horizontal adjustment of the position of the device. The vertical position is also secured by slotted vertical holes in the angle iron 208. However to make the adjustment easier and to maintain alignment during tightening of the bolts, a turnbuckle assembly 206 mounted to a lower plate 204 connected to an base frame trough a clamping loop 202, provides a stabilizing vertical force.

While the invention has been described with regards to specific embodiments, those skilled in the art will recognize that changes can be made in form and detail without departing from the spirit and scope of the invention.

What is claimed is:

1. A hinged weight support apparatus comprising:

a tubular pan body fixed to a base;

a load arm rotatably fixed to an upper tilt axis of said pan body;

wherein a weight support portion of said load arm extends in a first direction from said upper tilt axis;

wherein a crank arm portion of said load arm extends in a second direction, approximately opposite to said first direction, from said upper tilt axis to a crank pin axis located away from said upper tilt axis by a crankarm distance.

a spring element having an adjustable spring tension, wherein said spring element has a bottom end rotatably fixed to a lower spring support member of said pan body, said spring element passing through a portion of said tubular pan body and having a top end rotatably fixed to a crank pin axis member.

2. The hinged weight support apparatus of claim 1, wherein said tubular pan body is fixed to said base through a rotatable connection.

3. The hinged weight support apparatus of claim 2, wherein said tubular pan body has a central axis about which said tubular pan body is rotatable.

4. The hinged weight support as in claim 3, wherein a load arm stop can be activated at a predetermined number of discrete load arm positions.

5. The hinged weight support apparatus of claim 2, wherein said base is a plate and said tubular pan body extends through said plate with a bearing flange on the outside of said pan body.

6. The hinged weight support as in claim 5, wherein a load arm stop can be activated at a predetermined number of discrete load arm positions.

7. The hinged weight support as in claim 2, wherein a load arm stop can be activated at a predetermined number of discrete load arm positions.

8. The hinged weight support apparatus of claim 1, wherein said spring element includes a coil spring having a first end and a second end a central rod that extends through the coils of said spring, wherein a spring end of said rod connects to a spring flange at a first end of said spring, and a free end of said rod connects to a first choice from a list of two elements: the first being the bottom end of said spring element which is rotatably fixed to said lower spring support member, the second being the top end of said spring element which is rotatably fixed to a crank pin axis member, and a spring peripheral tube surrounding the coils of said spring, wherein said peripheral tube at a spring end has an inwardly extending flange to engage the ends of the coil at said second end of said spring as said spring peripheral tube is urged toward said first end of said spring, wherein a free end of said spring peripheral tube is connected to a second choice, different than said first choice from said list of two elements.

9. The hinged weight support apparatus of claim 5, wherein said spring element is positioned between internal tubular walls of the pan body such that said bottom end of said spring element which is rotatable fixed to said lower spring support member is connected to said pan body through pin and device elements which are approximately centered between sidewalls of the pan member at a bottom end of the pan member and such that said top end of said spring element which is rotatably fixed to a crank pin axis member is connected to said crank pin axis member through pin and device elements connected to said crank arm axis of said load arm, where said elements are approximately centered between the sidewalls of the pan member at an upper end of the pan member.

10. The hinged weight support as in claim 9, wherein a load arm stop can be activated at a predetermined number of discrete load arm positions.

11. The hinged weight support as in claim 8, wherein a load arm stop can be activated at a predetermined number of discrete load arm positions.

12. The hinged weight support apparatus of claim 1,
wherein said load arm is capable of rotating more than ninety degrees.

13. The hinged weight support as in claim 12,
wherein a load arm stop can be activated at a predetermined number of discrete load arm positions.

14. The hinged weight support apparatus as in claim 1,
wherein as said crank arm portion of said load arm rotates said crank pin axis moves to cause the spring element to shorten and then to extend, such that the load arm is considered to move over-center.

15. The hinged weight support as in claim 14,
wherein a load arm stop can be activated at a predetermined number of discrete load arm positions.

16. The hinged weight support as in claim 1,
wherein a load arm stop can be activated at a predetermined number of discrete load arm positions.

17. The hinged weight support as in claim 1,
wherein a load arm tilt travel limit prevents the load arm from fully descending to a fully lowered position except at a predetermined pan angle position.

18. The hinged weight support as in claim 1,
wherein said adjustment of said spring tension of said spring member requires only the rotation of a central rod relative to a central rod nut.

19. The hinged weight support as in claim 1, wherein a tilt angle between said weight support portion of said load arm and said crank arm portion of said load arm is adjustable by loosening at least one clamp bolt, changing the tilt angle between the weight support portion and said crank arm portion by moving said clamp bolt in a slot and re-clamping said at least one clamp bolt.

* * * * *